(No Model.)
G. B. WILLIAMS.
FLUID PRESSURE AUTOMATIC BRAKE MECHANISM.
No. 393,872. Patented Dec. 4, 1888.
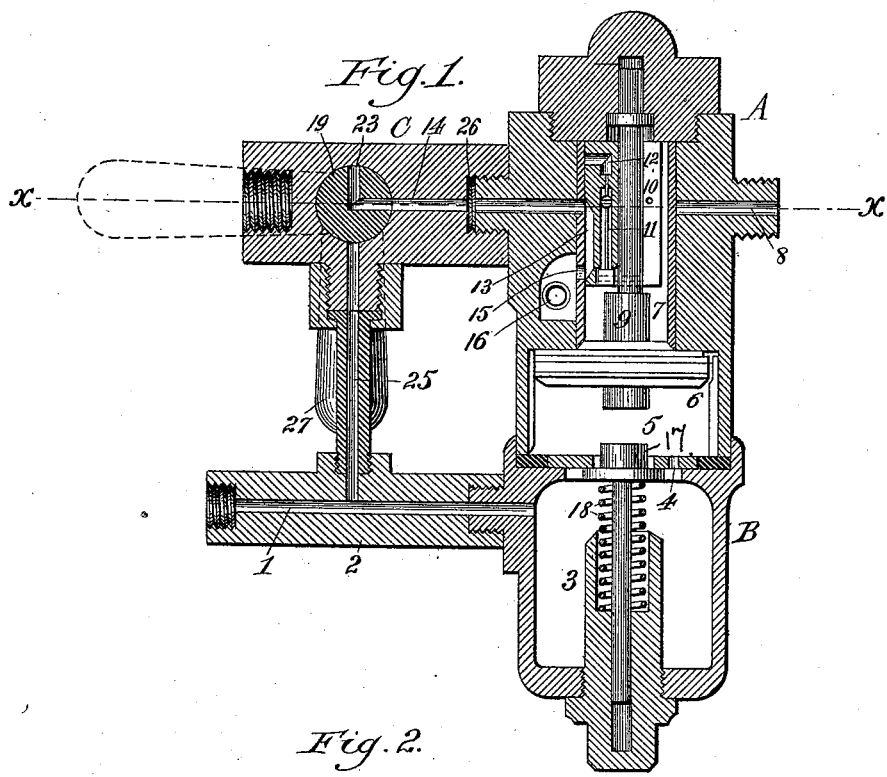
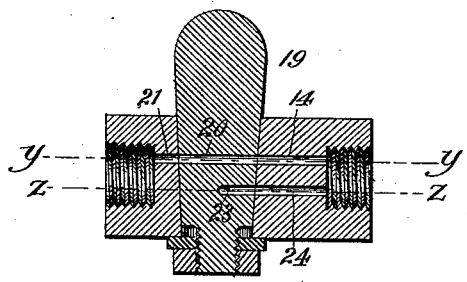
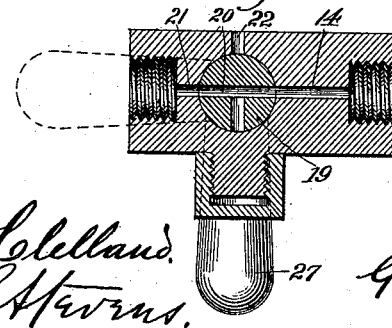
Witnesses:
Geo. B. McClelland
Henry C. Stevens.
Inventor:
George Bayley Williams.

UNITED STATES PATENT OFFICE.

GEORGE BAYLEY WILLIAMS, OF LA CROSSE, WISCONSIN.

FLUID-PRESSURE AUTOMATIC-BRAKE MECHANISM.

SPECIFICATION forming part of Letters Patent No. 393,872, dated December 4, 1888.

Application filed December 20, 1887. Serial No. 258,530. (No model.)

*To all whom it may concern:*

Be it known that I, GEORGE BAYLEY WILLIAMS, a citizen of the United States, residing at La Crosse, in the county of La Crosse and State of Wisconsin, have invented or discovered certain new and useful Improvements in Fluid-Pressure Automatic-Brake Mechanism, of which the following is a specification.

In the known improvements in automatic brakes the brakes are released only by the piston of triple valve ascending to the upper extremity of its traverse, and the brake-cylinder at the same time having an outlet to the open air through the leakage-groove in the slide-valve. Ordinarily the piston of triple valve is forced to the upper extremity of its traverse by the full pressure of main reservoir being let into the main air-pipe, which presses on lower side of piston, overcoming the auxiliary-reservoir pressure on the other side of piston. It often happens, however, that the main-reservoir pressure is insufficient for this purpose, or the automatic brakes are applied on cars standing on side tracks or elsewhere disconnected from the main reservoir on the engine. As the piston of triple valve is actuated by the difference in pressure on its two sides, the brakes are then released by opening a cock and exhausting air from the auxiliary reservoir until the pressure on upper side of piston of triple valve has become less than the pressure on the lower side in the main air-pipe, when the piston will ascend to the upper extremity of its traverse and the air will commence to escape from the brake-cylinder, as before, through the exhaust-groove in slide-valve. This is very properly termed a "bleeding device," as it unnecessarily wastes the vitality of the brake on a regular train and delays the release of the brakes unnecessarily in proportion to such waste. Whether such cock bleeds directly from the brake-cylinder or from the auxiliary reservoir it must exhaust air from the auxiliary reservoir till the pressure therein is less than the pressure in the train-pipe or main air-pipe. If the cock severed the connection between the brake-cylinder and the auxiliary reservoir and then exhausted only the air from the brake-cylinder, it would have served all present requirements; but a serious objection to this would be that the cock must remain so turned and the connection between the auxiliary reservoir severed till the main air-pipe could have its pressure increased from main reservoir, and till such time the train could not start unless the brake was left inoperative on such car, for if the connection between auxiliary reservoir and brake-cylinder was opened while the pressure in auxiliary reservoir exceeded the pressure in main air-pipe the air would again pass from the auxiliary reservoir to the brake-cylinder, applying the brakes, and would continue to do so till the pressure in auxiliary reservoir had become reduced below the pressure in the main air-pipe.

My invention has for its object the overcoming of the disadvantages due to the foregoing-recited deficiencies in the automatic brake.

My improvement, generally stated, consists of any suitable mechanism for releasing the brakes by exhausting air from the brake-cylinder only, and at the same time allowing the pressures in auxiliary reservoir and in main air-pipe to be connected and equalize, so as to allow of lever of exhaust-cock being returned to its normal position when the brakes are released, and the mechanism being thus restored to proper working order without any reapplication of the brakes, which would be the result if the pressures were not so equalized and the piston of the triple valve lifted by the action of the graduating stem or piston. In other words, it consists of the combination of an auxiliary exhaust from brake-cylinder and an auxiliary channel between auxiliary reservoir and main air-pipe, both preferably controlled by the movement of the same cock or valve, though separate cocks or valves may be used for both without departing from my invention.

My improvements as claimed are hereinafter fully set forth.

Reference is to be had to the accompanying drawings, forming a part of this specification, in which similar references indicate corresponding parts in all the figures.

Figure 1 is a central vertical section of triple valve with my improvement attached. Fig. 2 is a sectional plan view of my improvement through line $x\,x$ of Fig. 1. Fig. 3 is a vertical section of my improvement through line $y\,y$ of Fig. 2.

The vertical section of my improvement through line $z\,z$ of Fig. 2 is shown in Fig. 1.

A represents the upper and B the lower cap of the Westinghouse triple valve, forming together the valve-case.

C represents my improved exhaust-cock.

The triple valve receives compressed air from the main air-pipe through a channel, 1, in T 2, which air passes into drip-cup 3, and thence through channel 4 into piston-chamber 5, pushing the piston to the extreme upper limit of its traverse and uncovering a feed-groove, 6, which allows air to pass into slide-valve chamber 7, and thence to the auxiliary reservoir through channel 8. In chamber 7 is a slide-valve, 10, having a limited free motion on stem of piston 9. Slide-valve 10 has a graduating-valve, 11, a discharge-port, 12, adapted to register with channel 14 when the piston descends, and an exhaust-groove, 13, which at the upper extremity of traverse of piston 9 connects the channel 14 with port 15 to allow of air passing from the brake-cylinder to the open air through exhaust-outlet 16. In the drip-cup is graduating-stem 17, actuated by graduating-spring 18, for closing slide-valve 10 by pressing the graduating-valve 11 to its seat when in the application of the brakes the pressure in the main air-pipe is the same as in the auxiliary reservoir.

So far as hereinbefore described the mechanism accords in all substantial particulars, and is adapted to operate similarly to that described in Letters Patent No. 220,556, issued to George Westinghouse, Jr.

My improvement consists in additional mechanism to be attached to the before-mentioned triple valve, or to any similar valve, or to be embodied in same as additional structural features. This improvement I will now proceed to describe.

The valve-case C contains a plug, 19, which has two channels in same. Channel 20 is T-shaped and normally registers with channel 14, leading to the triple valve, and with channel 21, leading to brake-cylinder, thus leaving the channel or pipe between triple valve and brake-cylinder unobstructed. When the lever is, however, turned to the position shown by the dotted lines in Fig. 3, channel 20 no longer registers with channel 14, but registers instead with port 22, leading to the atmosphere. Channel 23 is L-shaped, or may be a groove round plug, and normally only registers with channel 14, the cock being at cut-off so far as connection with channel 25 is concerned. When the lever of plug is, however, turned to the position shown by the dotted lines in Fig. 1, channel 23 will register both with channels 14 and 25 for allowing the pressure in the auxiliary reservoir to equalize with the pressure in the main air-pipe instead of wasting the excess contained in the auxiliary reservoir when it is desired to release the brakes by bleeding. From exhaust-cock C a channel or pipe, 25, leads to channel 1, which forms a part of the main air-pipe.

The exhaust-cock C and the channel 25 may both be contained in the valve-casing without departing from my invention.

The operation of the triple valve has been sufficiently explained already, except in so far as the operation of my improved exhausting mechanism is described, which I will now proceed to explain.

The brakes having been applied, and piston 9 being in the lower part of its traverse, it is desired to release the brakes, which is ordinarily accomplished by the engineer turning enough air into main air-pipe to force piston 9 to the upper extremity of its traverse, so that exhaust-groove 13 will register with channel 14 and with port 15, leading to exhaust-outlet 16 from brake-cylinder. It often happens, however, that the engineer cannot thus release the brakes, because the pressure remaining in the main reservoir is insufficient for this purpose. The ordinary remedy is to exhaust and waste the excess pressure in the auxiliary reservoir, and thus allow the pressure in main air-pipe to lift piston 9 to the extreme upper limit of its traverse for releasing the brakes. By this method the brakes cannot commence to release till the excess pressure in the auxiliary reservoir has been wasted unnecessarily.

In my improvement there is no waste whatever from the auxiliary reservoir, the exhaust being from brake-cylinder only, and the release of the brakes commencing as soon as lever 27 is turned to the position shown by the dotted lines in Figs. 1 and 3. The lever being so moved results in severing the connection between the brake-cylinder and the auxiliary reservoir through channel 14, in opening the connection between brake-cylinder and the atmosphere through exhaust-port 22, and in opening the connection between the auxiliary reservoir and the main air-pipe through channel 25. The exhaust of air from the brake-cylinder is immediate, and no other air whatever is wasted. While the air is passing from the brake-cylinder into the atmosphere the excess pressure in auxiliary reservoir is also passing into main air-pipe for the purpose of equalizing in both, which leaves considerably more pressure in the auxiliary reservoir than is the case in the ordinary process of bleeding, and also puts additional pressure in the main air-pipe, which the main reservoir is, hence, not drained of later. When the pressure in the auxiliary reservoir by expansion into the main air-pipe has become the same as the pressure in the main air-pipe, then the action of graduating-spring 18 causes piston 9 to rise, carrying with it graduating-valve 11, which seats in slide-valve 10 and prevents any further escape of air from auxiliary reservoir to brake-cylinder till the engineer again exhausts air from the main air-pipe, causing piston 9 again to descend. While lever 27 of exhaust-cock C is in the position shown by the dotted lines in Figs. 1 and 3, the channel or pipe between auxiliary reservoir and the brake-cylinder is obstructed and the brakes cannot be again applied till the lever 27 is returned to its normal position, severing the connection between the main air-pipe and the auxiliary reservoir and causing channel 20 to again register only with channels 14 and 21, as shown in Fig. 3. The equalizing of the pressure in auxiliary reservoir and train-pipe having resulted in closing slide-valve 10, the lever 27 can be returned to its normal position as soon as the air is exhausted from the brake-cylinder without any reapplication of the brakes, which would result if the pressure in auxiliary reservoir was still greater than the pressure in the main air-pipe. The usual release of the brakes by bleeding is by forcing piston 9 to the upper extremity of its traverse. In my improvement the piston 9 is only moved upward as far as the action of graduating-spring 18 will take it, there being an auxiliary exhaust for the escape of air from the brake-cylinder only. As the piston so stands resting on graduating-stem 17, the brakes can be applied more rapidly than at present, the air having been saved by means of my improvement for such application in an emergency or otherwise. As soon, however, as the engineer has sufficient pressure in main reservoir he will recharge the auxiliary reservoirs, thus moving piston 9 to the upper extremity of its traverse.

In using the terms "triple valve" and "triple valve device" I refer to a valve device, however specifically constructed, having a connection with the main air or brake pipe, another with an auxiliary reservoir or chamber for the storage of power, and another with a brake-cylinder or its equivalent for the utilization of the stored power, and with a release or discharge passage for releasing the operative power from the brake-cylinder whether the valves governing these passages or connections are arranged in one or more cases and are moved by a piston or its equivalent or by a series of pistons or their equivalents.

I am aware of the existence of other constructions, as herein referred to, which I hereby disclaim.

Though I have described my invention as an improved "bleeding device," using terms commonly applied to such devices, it is, properly speaking, an improved exhaust, which remedies the various defects of the bleeding devices.

I claim as my invention—

1. In a brake mechanism, a cock or valve which in its normal position establishes communication between the triple valve and the brake-cylinder, at the same time closing the communication between the brake-cylinder and an auxiliary exhaust-outlet and between the auxiliary reservoir and the main air-pipe through an auxiliary channel, but which is adapted for reversing these conditions when its lever is turned, so as to close the communication between the triple valve and the brake-cylinder, when it will establish a communication between the brake-cylinder and the open air through an auxiliary exhaust-outlet for the purpose of releasing the brakes, and will also establish a communication between the auxiliary reservoir and the main air-pipe through an auxiliary channel, so as to equalize the pressure in the auxiliary reservoir and main air-pipe, in order to allow the graduating-piston to rise and move piston of triple valve upward sufficiently to close the feed-port of triple valve, and thus prevent the reapplication of the brakes, when valve C is again moved to its normal position, substantially as shown and described.

2. In a brake mechanism, the combination of a main air-pipe, an auxiliary reservoir, a brake-cylinder, a triple valve, an auxiliary channel or pipe connecting the main air-pipe with the auxiliary reservoir, an auxiliary exhaust from the brake-cylinder, and a cock or valve for controlling both the auxiliary channel between the main air-pipe and the auxiliary reservoir and the auxiliary exhaust from the brake-cylinder, substantially as shown and described.

3. In a brake mechanism, the combination of a main air-pipe, an auxiliary reservoir, a brake-cylinder, a triple valve, and an auxiliary valve or cock controlling the feed-channel from auxiliary reservoir to brake-cylinder, the communication between brake-cylinder and the open air, and the communication between the auxiliary reservoir and the main air-pipe through an auxiliary channel or pipe, substantially as shown and described.

GEORGE BAYLEY WILLIAMS.

Witnesses:
JOHN J. HARTLEY,
HENRY C. STEVENS.